United States Patent
Papakipos et al.

(10) Patent No.: US 6,906,718 B1
(45) Date of Patent: Jun. 14, 2005

(54) METHOD AND SYSTEM FOR EFFICIENTLY EVALUATING AND DRAWING NURBS SURFACES FOR 3D GRAPHICS

(75) Inventors: Matthew N. Papakipos, Menlo Park, CA (US); Carroll Philip Gossett, Mountain View, CA (US); Christian Pappas, Palo Alto, CA (US); Henry P. Moreton, Oakland, CA (US); Robert J. Williamson, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1512 days.

(21) Appl. No.: 08/845,526

(22) Filed: Apr. 25, 1997

(51) Int. Cl.[7] ............................................. G06T 11/40
(52) U.S. Cl. ........................................ 345/441; 345/420
(58) Field of Search .............................. 345/420, 441, 345/442

(56) References Cited

U.S. PATENT DOCUMENTS

| | | | | |
|---|---|---|---|---|
| 5,202,670 A | * | 4/1993 | Oha | 340/728 |
| 5,278,948 A | * | 1/1994 | Luken, Jr. | 395/123 |
| 5,488,684 A | * | 1/1996 | Gharachorloo et al. | 395/123 |
| 5,717,847 A | * | 2/1998 | Schulmeiss | 395/142 |
| 5,726,896 A | * | 3/1998 | Jia et al. | 364/474.29 |
| 5,734,756 A | * | 3/1998 | Sherman et al. | 382/259 |

* cited by examiner

Primary Examiner—Mano Padmanabhan
(74) Attorney, Agent, or Firm—Woodcock Washburn LLP

(57) ABSTRACT

The present invention comprises a computer implemented process and system for rendering curves or surfaces as 3D graphics on a display. The system of the present invention includes a computer system having a processor, a bus, and a 3D graphics rendering pipeline. The curves or surfaces are modeled by non-uniform rational B-splines (NURBS). The process of the present invention functions by receiving a NURBS model for rendering from a software program running on the host processor. The NURBS model defines a curve or surface. The process of the present invention efficiently converts the NURBS model to a Bezier model using the hardware of the graphics rendering pipeline. The Bezier model describes the same curve or surface. The process of the present invention subsequently generates a plurality of points on the curve or surface using the Bezier model and the graphics rendering pipeline. The points are then used by the graphics rendering pipeline to render the curve or surface defined by the Bezier model. Alternatively, a NURBS model is directly evaluated into a plurality of points on a curve or surface, and in turn, rendered into the curve or surface. This direct rendering of the NURBS model is implemented using the graphics rendering pipeline.

16 Claims, 13 Drawing Sheets

Table 1

Bezier control points

| | $\overline{222}$ | $\overline{223}$ | $\overline{233}$ | $\overline{333}$ |
|---|---|---|---|---|
| Interpolators 501 and 503 | $\dfrac{2-0}{3-0}$ | X | $\dfrac{3-1}{4-1}$ | $\dfrac{3-1}{4-1}$ |
| Interpolators 502 and 504 | $\dfrac{2-1}{4-1}$ | $\dfrac{2-1}{4-1}$ | X | $\dfrac{3-2}{5-2}$ |
| Interpolators 505 and 506 | $\dfrac{2-1}{3-1}$ | 1 | 0 | $\dfrac{3-2}{4-2}$ |
| Interpolator 507 | 0 | 0 | 1 | 1 |

X = Don't care

FIG. 10

METHOD AND SYSTEM FOR EFFICIENTLY EVALUATING AND DRAWING NURBS SURFACES FOR 3D GRAPHICS

FIELD OF THE INVENTION

The field of the present invention pertains to computer implemented graphics. More particularly, the present invention relates to a system and method for rendering parametric curved surfaces in a three dimensional graphics environment.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices. Graphical user interfaces have replaced textual interfaces as the standard means for user computer interaction.

Graphics have also become a key technology for communicating ideas, data, and trends in most areas of commerce, science, and education. Until recently, real time user interaction with three dimensional (3D) models and pseudo-realistic images was feasible on only very high performance workstations. These workstations contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

In a typical 3D computer generated object, the surfaces of the 3D object are described by data models. These data models store "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded onto an array of pixels, creating a realistic 3D image.

Many applications require the generation of smooth surfaces and smooth curves. To realistically generate a real-world image, the surfaces of objects in the image need to be realistically modeled. The most common representation for 3D surfaces are "polygon meshes." A polygon mesh is a set of connected, polygonal bounded, planar surfaces. Open boxes, cabinets, and building exteriors can be easily and naturally represented by polygon meshes. Polygon meshes, however, are less easily used to represent objects with curved surfaces.

Referring now to prior art FIG. 1A, a simple polygon mesh of a section 10 of a patch is shown, while prior art FIG. 1B shows an actual section 11 of a patch. Each polygon of the section 10 is a mathematical representation of a corresponding portion of the surface of the section 11. The interconnecting vertices (e.g., vertices 13) and the interconnecting edges of the polygons (e.g., edges 12) collectively define the surface of section 10 in 3D space. There are obvious short comings, however, in the accuracy of the section 10 in comparison to actual section 11. The polygons model the surface of section 11, but the representation is only approximate. The "errors" of the approximation can be made arbitrarily small by using more and more polygons to create an increasingly accurate piecewise linear approximation.

Referring now to prior art FIG. 2A, prior art FIG. 2B, and prior art FIG. 2C, an initial representation 21, an intermediate representation 22, and a final representation 23, are shown respectively. The initial representation 21 is a polygon mesh of a rain drop. As described above, initial representation 21 consists of a fewer number of polygons, leading to a "blocky," or geometrically aliased, representation of the rain drop. It should be noted that the polygons of initial representation 21 are comprised of triangles, whereas the polygons of section 10 are comprised of quadrilaterals. Regardless of the nature of the polygon primitive (triangle, quadrilateral, and the like) used to model a curved surface, the general properties, e.g., geometric aliasing, are substantially the same.

In proceeding from initial representation 21 to intermediate representation 22, and to final representation 23, the number of polygons in the polygon mesh modeling the rain drop are greatly increased. The final representation 23 contains several orders of magnitude more polygons than initial representation 21. This yields a much more accurate piecewise linear approximation of the rain drop. Computer graphics engineers rely upon a techniques for modeling and manipulating the curved surfaces of the objects (e.g., the rain drop of final representation 23). For engineering and computer aided design applications, it is often highly advantageous to have as accurate a model as possible.

For example, engineers modeling the surface of the exterior body of an automobile, or modeling a new mechanical part for a jet engine, desire models which are as accurate as possible. The models should enable accurate visualization of their designs. The models should also be easily manipulated and transformed, allowing engineers to alter a design, visualize the result of the alteration, and subsequently alter the design again.

While modeling objects with curved surfaces can be accomplished using polygon meshes having very large numbers of polygons, such models are computationally very unwieldy. If an object is stored as a large polygon mesh, the demands upon the data transfer bandwidth of the workstations, the demands upon the processor power, demands upon memory for storing such models, and other such problems, combine to make fast easy intuitive 3D interaction and iterative design alteration very slow (if not impossible). As a result, the 3D workstation industry utilizes mathematical parametric representations of the curved surfaces of an object to define and model the object. Parametric models also allow an artist or designer to easily manipulate the global shapes of surfaces through a small number of interactions. Polyhedral models are computationally very intensive, requiring many vertices to be repositioned for even a minor change in the overall shape of the modeled object.

In a parametric representation, the curves of an object (e.g., the rain drop of FIG. 2) are defined mathematically using equations. The equations collectively form what is referred to as a parametric representation of the object, specifically, the curved surfaces of the object. Parametric representations overcome the problems posed by a polyhedral representation (e.g., a polygon mesh). The actual shape of the object can be very closely approximated using a parametric representation. This representation consumes several orders of magnitude less space than an equivalent polyhedral representation Thus, for example, the rain drop of FIG. 2C can be defined and stored as a parametric representation. This representation can be easily manipulated, easily altered, and easily transformed, among other advantages, in comparison to the polyhedral representation (e.g., final representation 23).

Perhaps the most widely used form of curved surface parametric representation are non-uniform rational B-spline representations (NURBS). NURBS are widely used in the computer aided design (CAD) industry to model curved surfaces. Among their many benefits, NURBS have two important advantages relative to other forms of parametric representation. The first advantage is that they are invariant under projective transformations. The second advantage is that they can very accurately define virtually any curved surface. Thus, NURBS are widely used in the field of 3D CAD. While parametric representations of curved surfaces and NURBS are discussed herein, the mathematical form and characteristics of curved surface parametric representation and NURBS are well known in the art. Those desiring a more extensive description of curved surface parametric representation and NURBS should consult "Gerald Farin, CURVES AND SURFACES FOR COMPUTER AIDED DESIGN, ISBN 0-12-249051-7" which is incorporated herein as background material.

The problem with NURBS, however, is the fact that the NURBS model is not "natively" rendered by the dedicated rendering hardware of prior art 3D graphics workstations. The rendering hardware of typical 3D graphics workstations are designed and optimized to function with polygons. The rendering algorithms, the special purpose rendering hardware, and the display hardware are designed to manipulate and display images generated from polygonal graphics primitives. Thus, the NURBS models need to be transformed using software into polygon meshes prior to rendering. This software executes on the host processor(s) or graphics co-processor(s), operates on the NURBS model, and creates a resulting polygon mesh stored in the memory of the 3D graphics workstation. The resulting polygon mesh is then rendered by the dedicated rendering hardware into a 3D image on a display. When an engineer makes a change to the NURBS model, the parameters of the NURBS model are changed, a new resulting polygon mesh is created, and the changed image is subsequently displayed.

This prior art rendering process, however, is slow. The specific rendering software which transforms the NURBS model into the resulting polygon mesh is computationally very expensive. Large numbers of clock cycles are consumed by the specific rendering software. This greatly detracts from the desired "interactive" quality of modern CAD. Additionally, other programs executing concurrently on the workstation are adversely impacted.

The prior art rendering process makes very large demands on the data transfer bandwidth of the 3D graphics workstation. The specific rendering software executes on the host processor(s) or graphics co-processor(s) and needs to move large amounts of data across the busses of the 3D graphics workstation (e.g., transfers to and from main memory or from graphics co-processors to polygon rasterizer(s)). This also adversely impacts other programs and processes running on the 3D graphics workstation.

In addition, the prior art rendering process does not utilize the dedicated rendering hardware of the 3D graphics workstation. Modern 3D graphics workstations often include very sophisticated and very extensive rendering subsystems. These subsystems are purposely designed to accelerate the 3D graphics rendering process. However, the specific rendering software, as described above, executes on the host processor(s) or graphics co-processor(s) and does not make use of the dedicated rendering hardware until the resulting polygon mesh is completely computed.

Thus, what is needed is a method which radically speeds up the 3D graphics rendering process. The method should greatly speed the process of rendering NURBS models. What is further required is a method which accurately renders NURBS models and does not unduly burden the data transfer bandwidth of the 3D graphics workstation, or consume an inordinate amount of host processor or graphics co-processor clock cycles. The method of the present invention provides a novel solution to the above requirements.

SUMMARY OF THE INVENTION

The present invention provides a method and a system which greatly increases the speed of the graphics rendering process. The method and system of the present invention increases the speed and efficiency of the process of rendering NURBS models. The method and system of the present invention accurately renders NURBS models without burdening the data transfer bandwidth of the computer system. In addition, the method and system of the present invention does not consume an inordinate amount of host processor or graphics co-processor clock cycles. In so doing, the present invention provides a fast and efficient process for rendering NURBS models.

In one embodiment, the present invention comprises a computer implemented process and system for rendering curved lines and surfaces as 3D graphics on a display. The system of the present invention includes a computer system having a processor, a bus, and a 3D graphics rendering pipeline. The curves and surfaces are modeled by non-uniform rational B-splines (NURBS). The process of the present invention functions by receiving a NURBS model for rendering from a software program running on the host processor. The NURBS model defines a curve or surface. The process of the present invention efficiently converts the NURBS model to a Bezier model using the hardware of the graphics rendering pipeline. The Bezier model describes the same curve or surface. The process of the present invention subsequently generates a plurality of points on the curve or surface using the Bezier model and the graphics rendering pipeline. The points on the surface are then used by the graphics rendering pipeline to render the curve or surface defined by the Bezier model. In so doing, the present invention provides a fast and efficient process for rendering NURBS models, hence, greatly increasing the speed of the graphics rendering process.

In another embodiment, the present invention renders a curve or surface directly from a NURBS model defining the curve or surface. In this embodiment, the present invention uses the graphics rendering pipeline to directly evaluate the NURBS control points of the NURBS model into points on a curve or surface. The points on the curve or surface are then used by the graphics rendering pipeline to render the curve or surface, in the manner described above.

Additionally, the present invention includes a method for automatically generating normals (e.g., vectors normal to the surface) for a surface defined by a NURBS model. After points on the surface have been generated, in the manner described above, the present invention uses the graphics rendering pipeline to generate normals for the surface. The normals are subsequently used to render realistic lighting and shading effects onto the surface.

BRIEF DESCRIPTION OF THE DRAWINGS

The present invention is illustrated by way of example and not by way of limitation, in the figures of the accompanying drawings and in which like reference numerals refer to similar elements and in which:

Prior Art

Prior Art

Prior Art

Prior Art

Prior Art

FIG. 10 shows a table illustrating the relationship between the LERP weights of a tri-linear interpolator and the resulting Bezier control points in accordance with one embodiment of the present invention.

DETAILED DESCRIPTION OF THE INVENTION

Figure 1A:
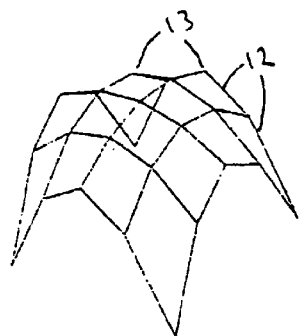
FIG. 1A shows a simple polygon mesh of a section of a patch of the prior art.
Figure 1B:
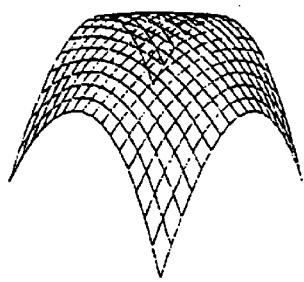
FIG. 1B shows an actual section of the patch of the prior art.
Figure 2A:
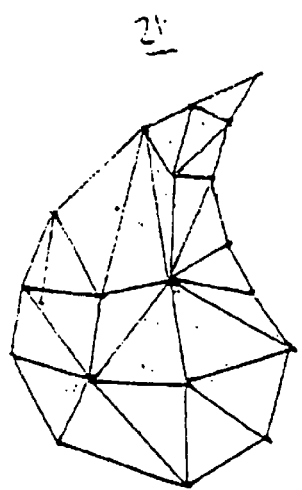
FIG. 2A shows an initial representation polygon mesh of the prior art.
Figure 2B:
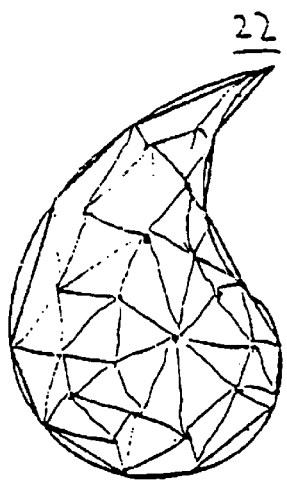
FIG. 2B shows an intermediate representation polygon mesh of the prior art.
Figure 2C:
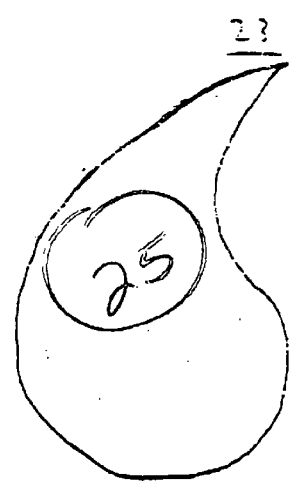
FIG. 2C shows a final representation polygon mesh of the prior art.

In the following detailed description of the present invention, a method and system for efficiently evaluating and drawing NURBS surfaces for 3D graphics, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "processing" or "computing" or "converting" or "generating" or "evaluating" or "drawing" or the like, refer to the action and processes of a computer system (e.g., computer system 1500 of FIG. 15), or similar electronic computing device, that manipulates and transforms data represented as physical (electronic) quantities within the computer system's registers and memories into other data similarly represented as physical quantities within the computer system memories or registers, or other such information storage, transmission, or display devices.

In one embodiment, the present invention comprises a computer implemented process and system for rendering curved surfaces as 3D graphics on a display. The system of the present invention includes a computer system having a processor, a bus, and a 3D graphics rendering pipeline. The surfaces are modeled by non-uniform rational B-splines (NURBS). NURBS are well known and are widely used as mathematical parametric models of 3D objects. The process of the present invention functions by receiving a NURBS model for rendering from a software program running on the host processor. The NURBS model defines a surface. The process of the present invention efficiently converts the NURBS model to a Bezier model using the hardware of the graphics rendering pipeline. Bezier models are similarly well known, and are also used as parametric models of 3D objects. The Bezier model describes the same surface. The process of the present invention subsequently generates a plurality of points on the curve or surface using the Bezier model and the graphics rendering pipeline. The points on the curve or surface are then used by the graphics rendering pipeline to render the curve or surface defined by the Bezier model.

In this manner, the present invention provides a method and a system which greatly increases the speed of the graphics rendering process. The method and system of the present invention increases the speed and efficiency of the process of rendering NURBS models. The method and system of the present invention accurately renders NURBS models without burdening the data transfer bandwidth of the computer system. In addition, the method and system of the present invention does not consume an inordinate amount of host processor or graphics co-processor clock cycles. In so doing, the present invention provides a fast and efficient process for rendering NURBS models. The present invention and its benefits are described in detail below.

Figure 3:
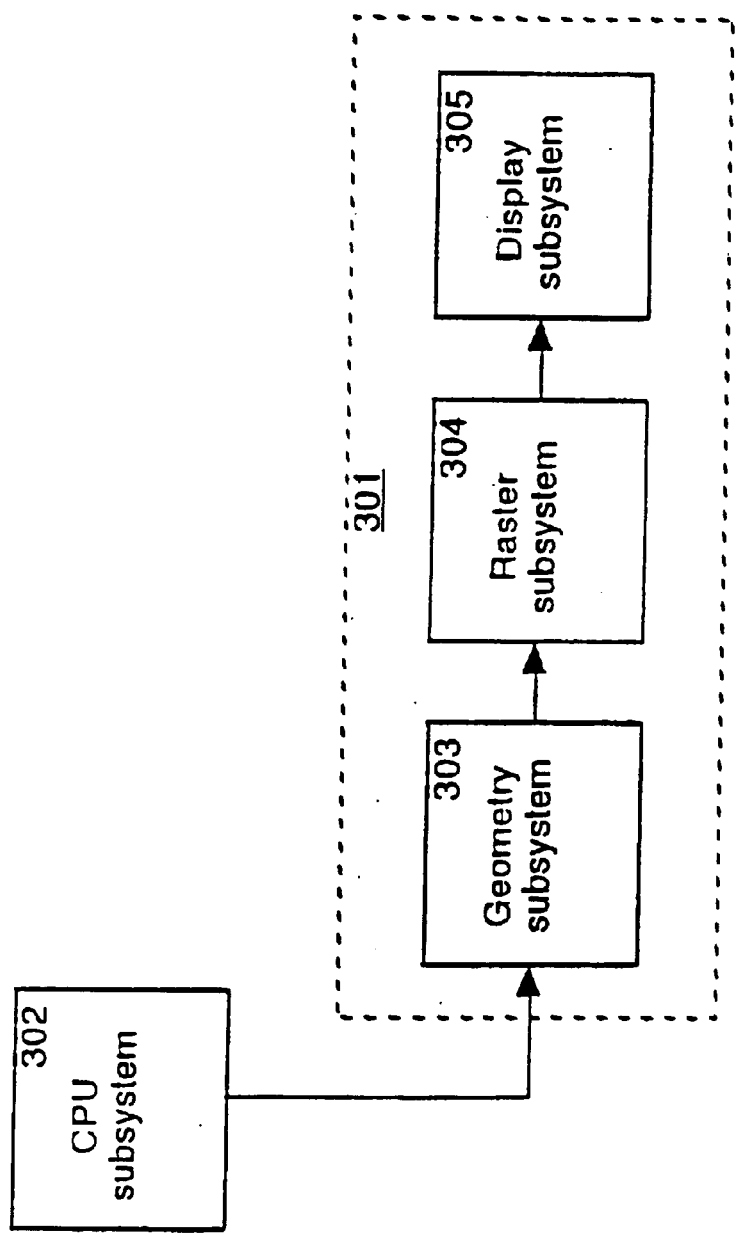
FIG. 3 shows a graphics rendering system in accordance with one embodiment of the present invention.

FIG. 3 shows a graphics rendering system in accordance with the present invention. Graphics rendering system 300 includes a graphics rendering pipeline 301 coupled to a central processing unit (CPU) subsystem 302. The graphics rendering pipeline is comprised of dedicated specialized graphics rendering hardware and is designed to greatly accelerate the process of rendering 3D graphics. The graphics rendering pipeline 301 includes a geometry subsystem 303, a raster subsystem 304, and a display subsystem 305, each coupled in pipeline fashion to CPU system 302.

As is well known in the art, the process of creating realistic images involves a number of stages arranged in the pipeline fashion as shown in graphics pipeline 301. The process of creating images from models is referred to as rendering, and is described below. Those desiring a more detailed discussion of the rendering process and a graphics rendering pipeline should consult U.S. Pat. No. 5,230,039 of Mark S. Grossman, Kurt B. Akeley, and Robert A. Drebin, which is incorporated herein as background material. Each subsystem (e.g., geometry subsystem 303) implements a stage of the rendering process. The subsystems of graphics pipeline 301 include dedicated special purpose graphics rendering logic implemented in hardware to greatly speed the rendering process.

With reference still to FIG. 3, the CPU subsystem 302 runs the application program which creates the models and responds to and interacts with the user. The models are stored as database structures maintained in main memory. The CPU subsystem 302, running the application program, traverses the model database and sends high level graphics data to the graphics rendering pipeline 301 for rendering.

The geometry subsystem 303 transforms and clips the graphics data from the models into screen coordinates. The geometry subsystem includes a plurality of floating point processors organized to perform geometric transformation calculations in parallel. Each floating point processor is referred to as a geometry engine. The geometry subsystem 303 further includes an input FIFO buffer to receive the graphics data from the CPU subsystem 302.

The raster subsystem 304 breaks points, lines and polygon data (e.g., graphics primitives) into pixels. This process is referred to as rasterization. The raster subsystem 304 performs the calculations required to reduces the graphics primitives received from the geometry subsystem to individual pixels. Each pixel is assigned an x, y screen position, plus a number of parameters per pixel, including z, red blue, alpha, and texture parameters s and t. These parameters are linearly interpolated between the vertices and the edges of the primitives (e.g., polygons).

The raster subsystem also computes visibility and writes pixel data to a frame buffer. The raster subsystem 304 takes pixel data generated by raster subsystem 304 and selectively updates the image and z bit planes of the frame buffer, using the results of z comparisons and alpha blending. The raster subsystem also performs antialiasing. Additionally, raster subsystem 304 includes a memory for storing "texels", or texture map elements. Each texel is composed of r, g, b, and alpha fields. Based upon the s and t parameters, raster subsystem 304 maps a textured pixel color onto each pixel stored in the frame buffer.

The display subsystem displays the contents of the frame buffer on a computer display monitor. The display subsystem receives the pixel information from the frame buffer, routes it through digital to analog converters, and displays the resulting analog signal on a color monitor. The color monitor displays each pixel of the rendered image in accordance with the data describing each respective pixel and in the specified image format (e.g., 1600×1200 pixels).

Figure 4:
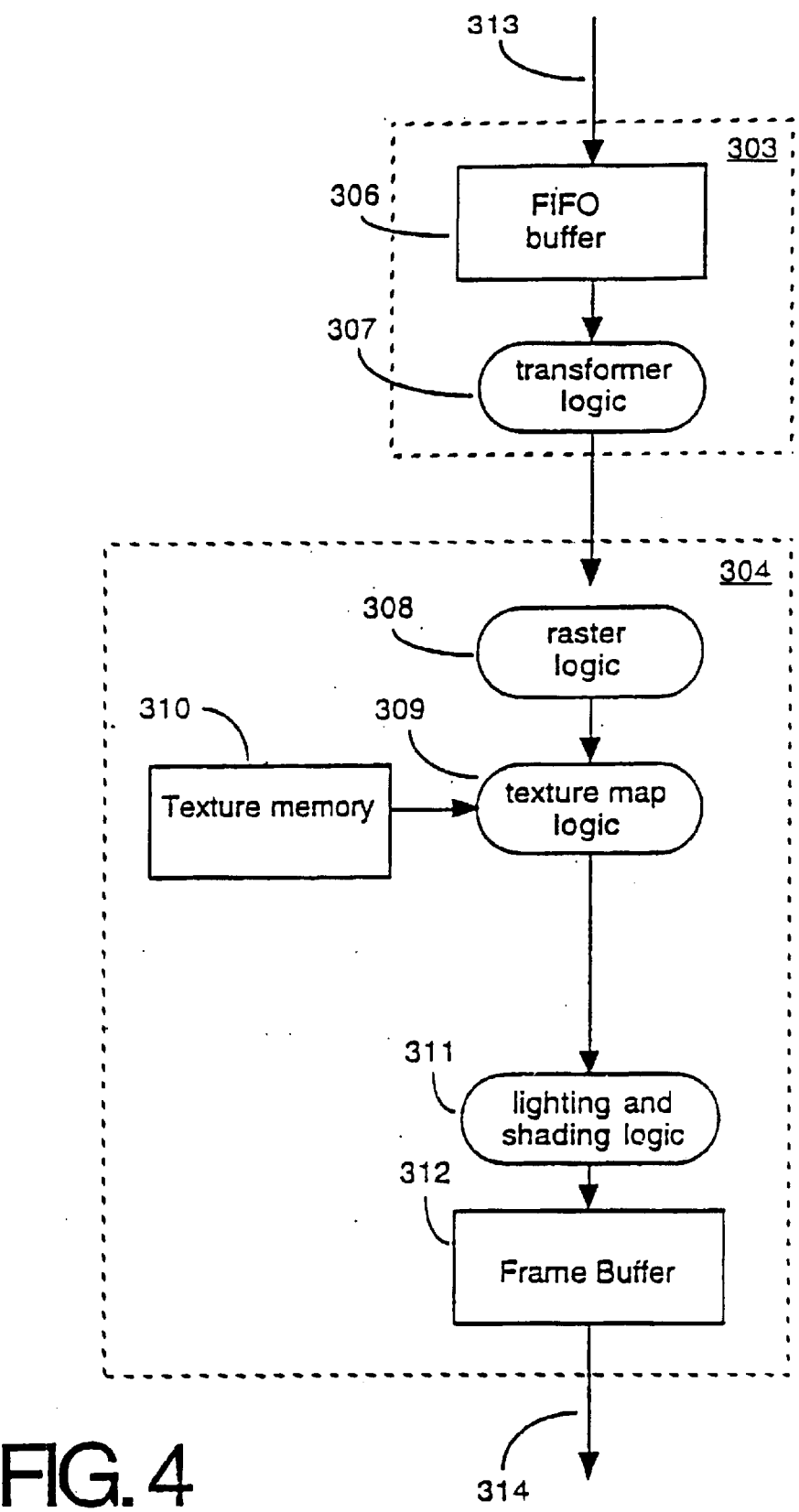
FIG. 4 shows a block diagram of a geometry subsystem and a raster subsystem in accordance with one embodiment of the present invention.

With reference now to FIG. 4, a block diagram of the geometry subsystem 303, the raster subsystem 304 in accordance with present invention is shown. The geometry subsystem 303 includes a FIFO buffer 306 coupled to receive graphics data via bus 313. As described above, geometry subsystem 303 performs geometry transformations, as represented by transformer unit 307. The raster subsystem 304 includes logic which rasterizes the primitives received from geometry subsystem 303 and performs the texture mapping computations. This logic is implemented in rasterizer unit 308 and texture mapping unit 309. Texture memory 310 stores the individual texture map elements (i.e., texels) and provides them to texture map unit 309. The raster subsystem 304 includes lighting and shading unit 311 coupled to receive the pixel data from the texture map unit 309. After filtering and blending operations for lighting, shading, and antialiasing, the pixel data is stored in a frame buffer 312 and subsequently output to display subsystem 305 via bus 314.

The method of the present invention functions by using the standard graphics pipeline hardware to render NURBS surfaces. The process of the present invention utilizes the texture mapping unit 309 to directly render NURBS models. In one embodiment, the process of the present invention efficiently converts the NURBS model to a Bezier model using the hardware of the graphics rendering pipeline. The Bezier model describes the same curved surface. The process of the present invention subsequently generates a plurality of points on the surface using the Bezier model and the graphics rendering pipeline.

As described above, prior art methods do not natively render NURBS models with the dedicated rendering hardware (e.g., graphics pipeline 301). The NURBS models are transformed into polygon meshes by software executing on the host processor (e.g., CPU subsystem 302). The polygon mesh is stored in a data base structure in main memory and traversed by the CPU subsystem 302 in accordance with the software. The resulting high level graphics data stream is transmitted to FIFO 306 and the image is rendered "conventionally" in the manner described above.

The present invention, however, utilizes the graphics rendering pipeline 301 to implement a method of natively rendering NURBS models. The raster unit 308, texture mapping unit 309, and texture memory 310 (each included within raster subsystem 304) are designed and optimized for processing conventional graphics primitives and texel data. The present invention utilizes this existing hardware to natively render NURBS models without first converting them to polygon meshes in CPU subsystem 303.

Figure 5:
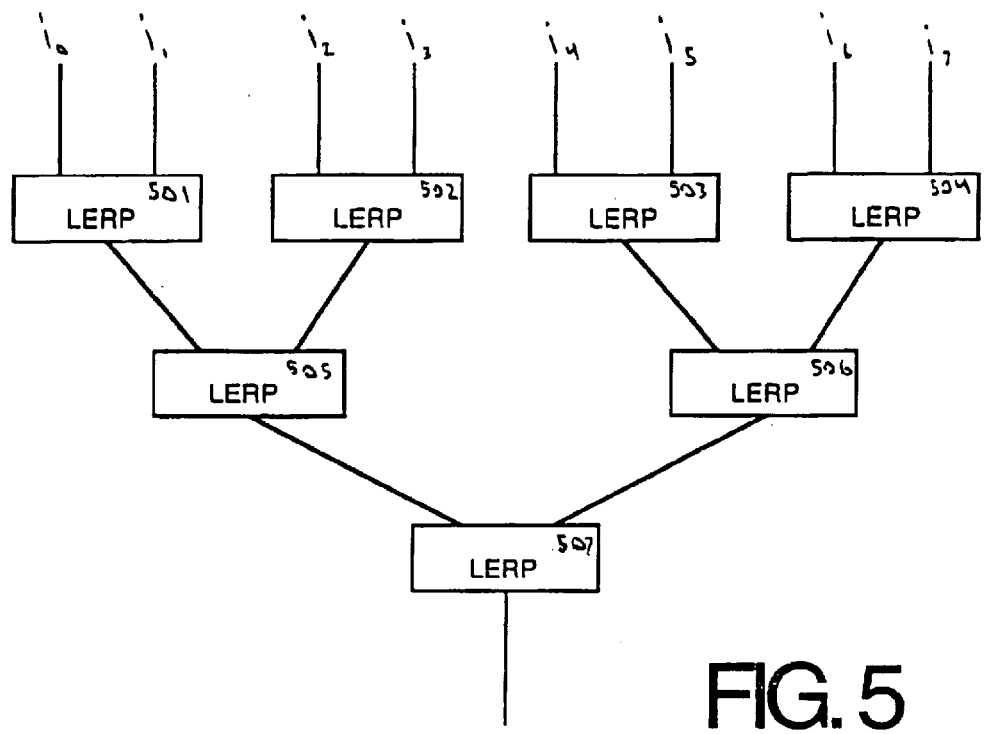
FIG. 5 shows a block diagram of a tri-linear interpolator in accordance with one embodiment of the present invention.

With reference now to FIG. 5, a block diagram of a tri-linear interpolator 500 is shown. Tri-linear interpolators (e.g., tri-linear interpolator 500) are utilized extensively within texture mapping unit 309. As is well known in the art, tri-linear interpolator 500 includes seven linear interpolators 501 through 507. Linear interpolators 501, 502, and 503 form a bilinear interpolator. Two bi-linear interpolators combined with a common interpolator (e.g., linear interpolator 507) form a tri-linear interpolator. Bilinear interpolation is used to interpolate texels in a 2D image. For example, linear interpolator 501 interpolates between input i0 and input i1. An interpolation ratio is determined by a "weight". An interpolation weight closer to 0.0 results in an interpolation output closer to i0, while and interpolation weight closer to 1.0 results in an interpolation output closer to i1. Each linear interpolator is typically referred to as a "LERP", each interpolation weight is referred to as a "LERP weight", and hence, tri-linear interpolator 500 is referred to as a "LERP tree". Quantitatively, the function of each linear interpolator can be expressed as: t*i1+(1−t)*i0, where t equals the LERP weight.

As is well known in the art, bilinear interpolation is conventionally used to interpolate between four texels to produce a blended color for a fragment. Four texels, which surround the s and t texture coordinates of interest, are used to generate the texture color of each fragment. Two pairs of texels, arranged in a 2×2 array, are each pairwise interpolated horizontally to generate two new interpolates. These interpolates are then interpolated vertically to generate the final filtered texture color (using interpolator 505).

Tri-linear interpolation is used to interpolate between texels at different scales (i.e., texel screen projection size). Thus, as is well known in the art, tri-linear interpolation interpolates between the output of two bilinear interpolators. Hence, the output of interpolator 505 and the output of interpolator 506 is interpolated (by interpolator 507) to obtain a filtered color for the fragment. Thus, tri-linear interpolator 500 is often referred to as a filter. Tri-linear interpolators (e.g., tri-linear interpolator 500) are utilized extensively in the hardware of texture mapping unit 309.

The process of the present invention, however, uses tri-linear interpolator 500 to process NURBS or Bezier control points, instead of texels. First, in the case of a Bezier curve, the process of the present invention uses tri-linear interpolator 500 to generate points on the surface defined by the Bezier model. The Bezier control points define a surface. Once the points on the surface are generated, they are feed back into FIFO 306 as graphics primitives and subsequently rendered into the surface defined by the Bezier model. The process of rendering the points on the surface into an image, occurs in the graphics rendering pipeline, in the manner described above. Thus, the process of the present invention renders the Bezier model into a surface without using the CPU subsystem (e.g., CPU subsystem 302) or data transfer bandwidth between main memory and the CPU subsystem or graphics co-processor.

Figure 6:
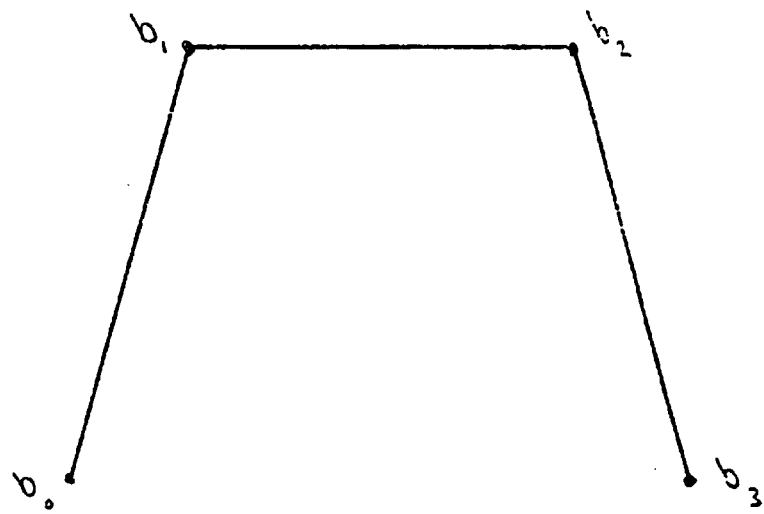
FIG. 6 shows a geometric spatial representation of four control points of a Bezier curve.

Referring now to FIG. 6, a spatial representation of four control points of a Bezier curve is shown. The shape of a Bezier curve is defined by the control points b0, b1, b2, and b3. The control points b0, b1, b2, and b3 are shown in what is referred to in the art as a "de Casteljau form", thus, the spatial relationship between the four control points and the lines connecting them as shown. The basic recursive de Casteljau algorithm is stated as:

$$b_i^K = b_i^{K-1} * (u+1) + b_{i+1}^{K-1} \cdot u_1 \text{ where } b_i^0 = b_i \qquad \text{Equation 1}$$

The term u is a parametric value and i and k are both indices of the recursion.

The process of the present invention utilizes tri-linear interpolator 500 to evaluate the Bezier curve defined by the control points b0, b1, b2, and b3. The process of the present invention implements the de Casteljau algorithm in tri-linear interpolator 500.

Figure 7A:
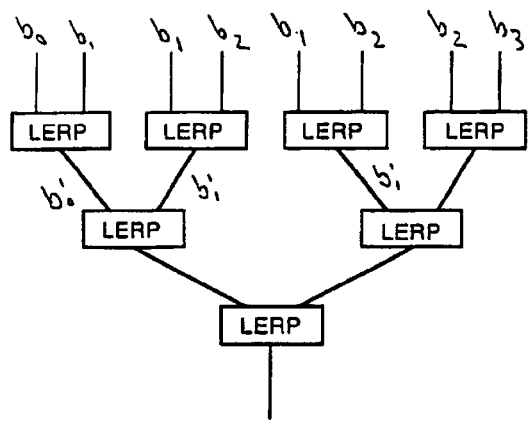
FIG. 7A shows the four control points from FIG. 6 plugged into the inputs of the tri-linear interpolator from FIG. 5 in accordance with one embodiment of the present invention.

Referring now to FIG. 7A, the four control points b0, b1, b2, and b3 are shown plugged into the inputs of tri-linear interpolator 500. Each of interpolators 501–504 produces a respective intermediate control point as shown (e.g., resulting point b10 shown beneath interpolator 501). The intermediate control points are subsequently interpolated using interpolators 505–507 to obtain a resulting point on the curve (e.g., b30 from interpolator 507). In this manner, the linear interpolators of tri-linear interpolator 500 are used to generate a series of points on the curve. Each "pass" through tri-linear interpolator 500 yields one point one the curve. In accordance with equation 1, by varying the LERP weight used by all of tri-linear interpolators 501–507, the output of interpolator 507 yields varying points on the curve. The LERP weights numerically range from 0.0 to 1.0. This process of generating points on a curve defined by a cubic polynomial equation (e.g., a Bezier curve) in this form is the de Castlejau algorithm, and its execution is referred to as evaluation.

Figure 7B:
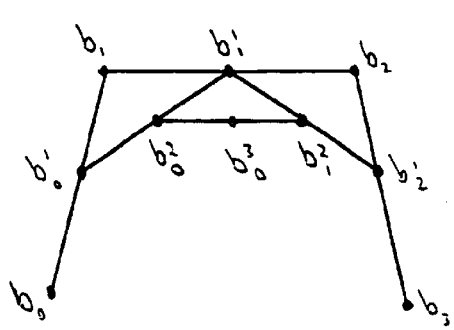
FIG. 7B shows a geometric spatial representation of the four Bezier control points, their respective intermediate control points, and the resulting point on the curve in accordance with one embodiment of the present invention.

FIG. 7B shows the spatial relationship of the four Bezier control points b0, b1, b2, and b3 along with their respective intermediate control points and the resulting point on the curve, b30. As described above, each pass through tri-linear interpolator 500 produces a point on the curve. The location of this point is determined by the LERP weights used in each of interpolators 501–507. For example, FIG. 7B shows the resulting point on the curve (e.g., b30) in the case where the LERP weights are equal to 0.5. It should be noted that a LERP weight at one half the numerical range (e.g., 0.5) yields a point on the curve located at the mid point of the curve. Thus, a pass through tri-linear interpolator 500 using a LERP weight of 0.25 yields a resulting point on the curve located one quarter of the way along the length of the curve. In this manner, successive passes are made through tri-linear interpolator 500 using differing LERP weights (e.g., 0.0, 0.25, 0.5, 0.75, and the like) yielding a series of points on the curve, and ultimately, a series of points on the surface.

Figure 7C:
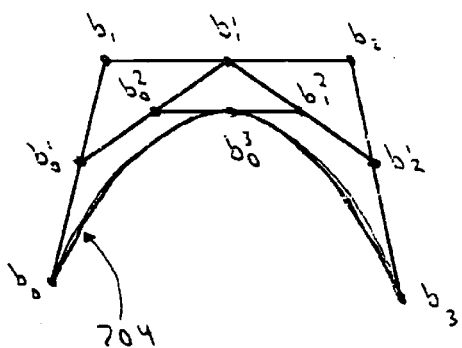
FIG. 7C shows a curve defined by the Bezier control points from FIG. 7B.

FIG. 7C shows a curve 704 defined by Bezier control points b0, b1, b2, and b3. As described above, the resulting point b30 on the curve 704 is located at the midpoint of the curve. As successive passes are made through tri-linear interpolator 500 with differing LERP weights, differing points on curve 704 are defined. Using these resulting points, curve 704 is rendered by the graphics rendering pipeline 301 (shown in FIG. 3). The resulting points are feed back into FIFO 306 as graphics primitives and subsequently rendered into the curve defined by the Bezier model. The rendering process subsequently proceeds in the graphics rendering pipeline, in the manner described above.

In this manner, the process of the present invention evaluates and renders Bezier curves. Bezier curves are directly evaluated in raster subsystem 304. By using the dedicated tri-linear interpolators of texture mapping unit 309 (shown in FIG. 4), the process of the present invention implements in fast hardware what was conventionally implemented in software on either the CPU subsystem or graphics co-processor, thus greatly accelerating the rendering process.

Figure 8A:
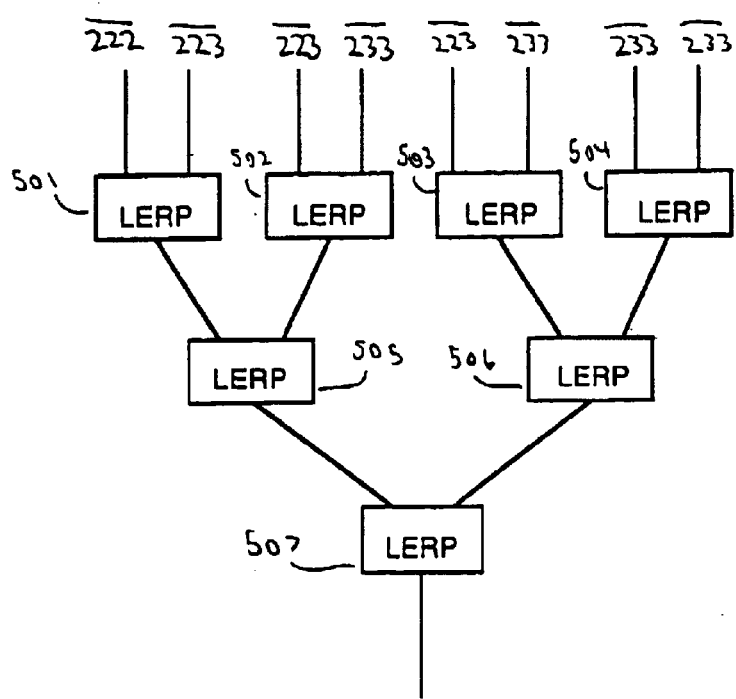
FIG. 8A shows the tri-linear interpolator from FIG. 5 with Bezier control point inputs in blossom notation in accordance with one embodiment of the present invention.
Figure 8B:
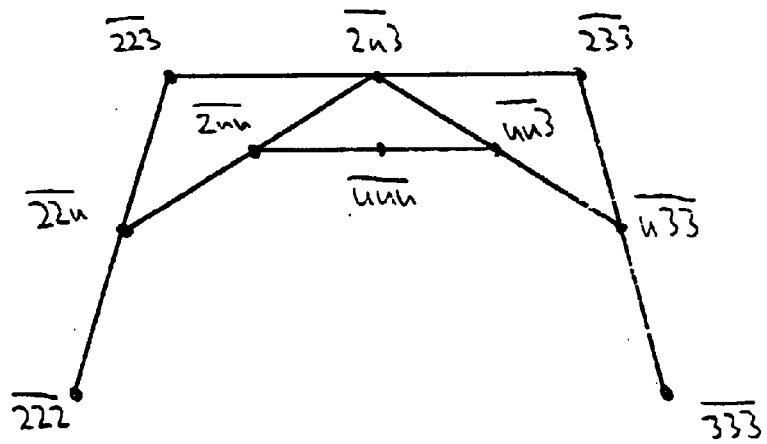
FIG. 8B, shows a geometric spatial representation of the four Bezier control points and intermediate control points, in blossom notation, in accordance with one embodiment of the present invention.

With reference now to FIG. 8A and FIG. 8B, the tri-linear interpolator 500, and four Bezier control points and intermediate control points, are respectively shown. The four Bezier control points and intermediate control points are shown using blossom notation. Blossom notation comprises another form of representing the de Casteljau algorithm and is well known in the art. The terms of the blossom notation represent the repeated linear interpolations carried out by tri-linear interpolator 500. Particularly, the blossom form is defined as follows:

$$\overline{abu} = \overline{abc} * (1-u) + \overline{abd} * u \qquad \text{Equation 2}$$

where a, b, c, and d are control point values and u is an arbitrary parametric variable. Thus, FIGS. 8A and 8B are the same as FIGS. 7A and 7B except for the fact that they are illustrated using the blossom form.

Accordingly, in order to evaluate and render NURBS models, the NURBS models first need to be translated into Bezier models. Once the NURBS model is translated into a Bezier model, the process of the present invention evaluates and renders the Bezier model in the manner described above. The blossom form provides an efficient way of describing NURBS curves. The present invention translates NURBS models into Bezier models to facilitate fast and efficient evaluation. Bezier models are inherently well suited to relatively fast evaluation using tri-linear interpolators. However, NURBS models represent useful shapes more efficiently than Bezier models. Hence, NURBS models are more widely used in the CAD field.

Figure 9A:
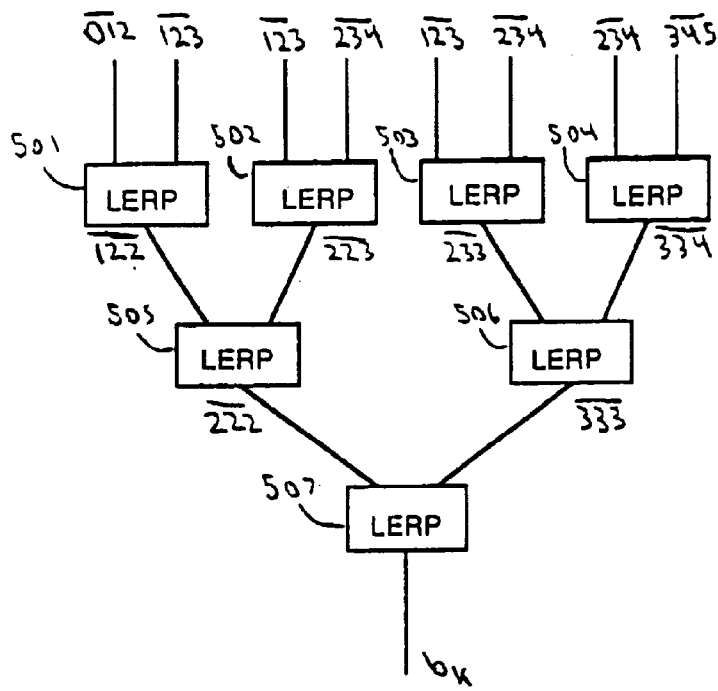
FIG. 9A shows the tri-linear interpolator from FIG. 5 having NURBS control point inputs in accordance with one embodiment of the present invention.
Figure 9B:
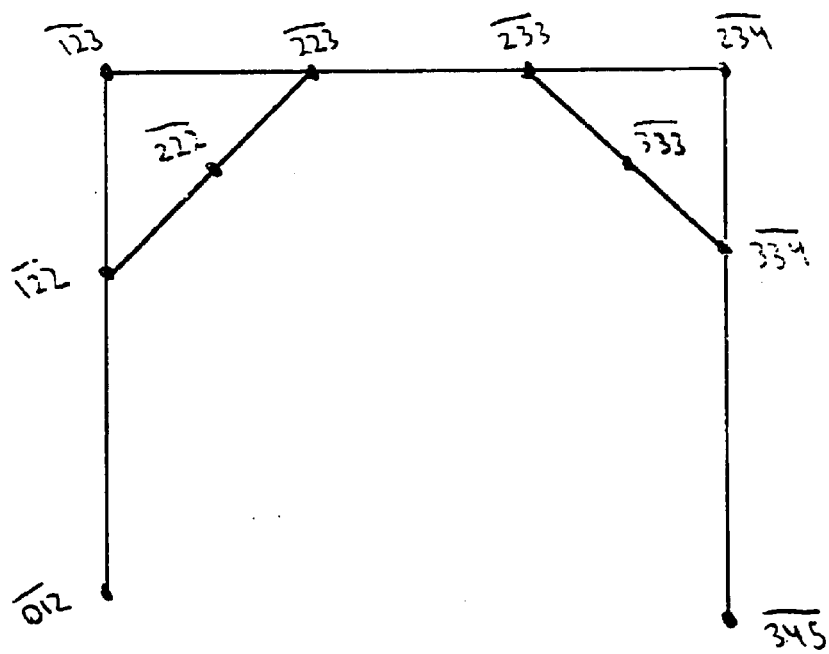
FIG. 9B shows a geometric spatial representation of a NURBS to Bezier conversion in accordance with one embodiment of the present invention.

FIG. 9A shows the tri-linear interpolator 500 and FIG. 9B shows a NURBS to Bezier conversion. Control points 012, 123, 234, and 345 comprise NURBS control points for a NURBS model. These NURBS control points are fed into tri-linear interpolator 500 in the manner shown in FIG. 9A. Each pass through tri-linear interpolator 500 yields a Bezier control point at the output $b_k$. Thus, four passes are required to yield Bezier control points 222, 223, 233, and 333. Generally, the four Bezier control points define a curve equivalent to that defined by the four NURBS control points 012, 123, 234, 345. In a manner similar to the Bezier evaluation described above, the LERP weights of each of the interpolators are varied to obtain the desired Bezier control point. The LERP weights are varied in accordance with a table shown in FIG. 10.

FIG. 10 shows a table (e.g., table 1) illustrating the relationship between the LERP weights of tri-linear interpolator 500 and the resulting Bezier control points. Thus, in accordance with table 1, to obtain Bezier control point 222, the LERP weights for the particular interpolators are as shown in the 222 column, to obtain Bezier control point 223, the LERP weights for the particular interpolators are determined via the terms shown in the 223 column, and so on. In this manner, the process of the present invention determines Bezier control points 222, 223, 233, and 333 from the NURBS control points 012, 123, 234, and 345. In the present embodiment, table 1 is computed on the CPU subsystem (e.g., CPU subsystem 302) ahead of time in double precision.

It should be appreciated that the equations shown in table 1 result from the geometric relationship between the control points of NURBS curves and the control points of Bezier curves. The equations shown in table 1 can be derived directly form the symmetry of the blossom function. For example, in the cubic case, going from B-spline control points A, B, C, D, and knot values a, b, c, d, e, and f, Bezier control points A', B', C', and D' are derived using the following equations:

$$B'=((c-b)/(e-b))*(C-B)+B$$

$$C'=((d-b)/(e-b))*(C-B)+B$$

$$X=((c-a)/(d-a))*(B-A)+A$$

$$Y=((d-c)/(f-c))*(D-C)+C$$

$$A'=((c-b)/(d-b))*(B'-X)+X$$

$$D'=((d-c)/(e-c))*(Y-C')+C'$$

where X and Y are temporary variables.

The above equations implemented in a tri-linear interpolator 500 as shown in FIG. 8A and Table 1 of FIG. 10. Thus, in a hardware implementation, there are four separate LERP weights and four control points received from two "textures". Thus, the control points would be the NURBS control points taken four at a time from a control "mesh", and the four LERP weights would come from another texture or lookup table generated from the knot sequence.

Before the conversion from NURBS to Bezier, the NURBS curve needs to be transformed from the global to the local domain. The present invention implements this function by transforming from the global NURBS domain to the local Bezier domain. The global to local transformation is required due to the fact that, in the present embodiment, the NURBS curve and the Bezier curves resulting from the translation process are both defined over the interval [0, 1]. As is well known in the art, a NURBS model includes "knot vectors" which, in addition to the NURBS control points, define the curve. The transformation from the global to the local domain is governed by the equation:

$$u = \frac{\hat{u} - \hat{c}}{\hat{d} - \hat{c}} \qquad \text{Equation 3A}$$

where u equals the b-spline local parametric value, $\hat{u}$ equals the NURBS global parametric value, and $\hat{c}$ and $\hat{d}$ are both equal to a knot value from the NURBS curve. The present invention solves these terms and subsequently uses them with tri-linear interpolator 500 to convert NURBS models into Bezier models.

The other component of the global to local transform is the association between b-spline domain integral and the parameter value, u. As is well known in the art, for each value of u, there is a "block index", b, which identifies the location of the set of NURBS (and Bezier) control points which affect the surface shape at that parameter value, u.

$$\hat{b} \le \hat{u} < \widehat{b+1} \qquad \text{Equation 3B}$$

This equation can be encoded in a texture map or lookup table, in a fashion very similar to the encoding of the global to local parameter transformation described above.

Thus, after the NURBS curve is converted to a Bezier curve, the present invention evaluates and renders the Bezier curve in the manner described above. It should be appreciated that the conversion process takes place within the graphics pipeline hardware. As such, the present invention does not place undue data transfer bandwidth loads on the computer system.

It should be appreciated that each b spline domain interval defines an independent Bezier curve. To be more precise, for each B-spline domain interval with a sufficient number of knots to either side, the B-spline domain interval defines an independent Bezier curve. B-spline domain segments near the beginning and the end of a B-spline control point list do not have a sufficient number of knots or control points defined to determine a Bezier curve. A cubic B-spline curve with n vertices generates up to n-3 Bezier curves, generating 4(n-3) Bezier vertices.

Now consider the case of a Bezier surface patch. Points are evaluated on a surface in two stages. The Bezier patch consists of a 4×4 array of points. The present invention needs to evaluate at point "P" with coordinates of (s, t). In the first stage, the four rows of the patch are considered as Bezier curves, and evaluated at the s coordinate of each of these curves. In the second stage, the resulting four points from the first stage are treated as four points of a single Bezier curve. The present invention evaluates this curve at coordinate t, thereby obtaining the desired point P.

Figure 11A:
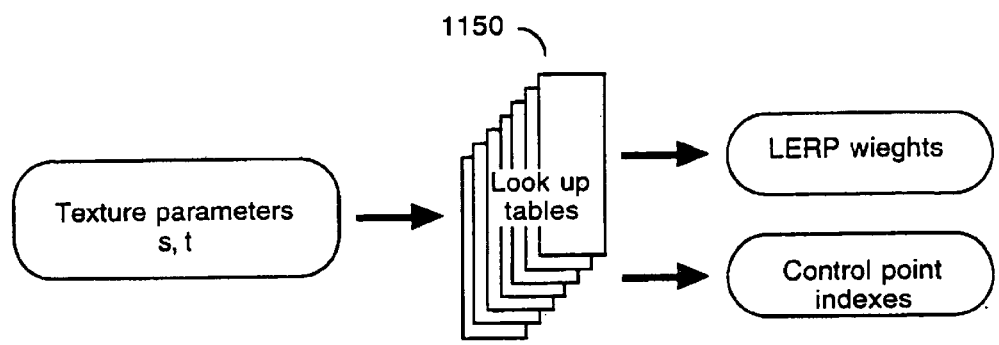
FIG. 11A shows a plurality of look up tables used in an alternate embodiment of the present invention.
Figure 11B:
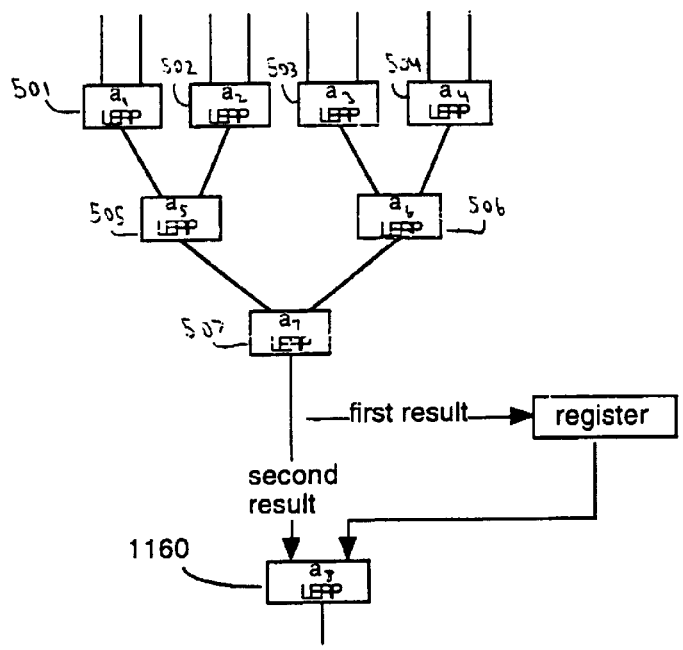
FIG. 11B shows a tri-linear filter which implements the direct NURBS evaluation.

With reference now to FIG. 11A and FIG. 11B, a process in accordance with an alternative embodiment of the present invention is shown. In this alternate embodiment, the NURBS model is directly rendered into a surface, as opposed to first being converted into a Bezier model and subsequently being rendered as described above. This embodiment implements a "Mansfield algorithm".

FIG. 11A shows a plurality of look up tables 1150. The look up tables 1150 are indexed with texture parameters s, and t. These parameters are mapped by look up tables 1150 into a series of LERP weights and a plurality of NURBS control points implementing a global to local transformation.

FIG. 11E shows a tri-linear filter 500 which implements the direct NURB evaluation. Tri-linear filter 500 includes two rows of inputs. The first row of inputs is comprised of NURBS control points A, B, C, D, E, F, G, and H. The second row of inputs is comprised of NURBS control points I, J, K, L, M, N, O, and P. Each of the linear interpolators 501–507, as described above include a LERP weight parameter. The LERP weight parameters are shown as a1, a2, a3, a4, a5, a6, and a7, respectively. In this embodiment, the output of interpolator 507 is coupled to a register and to one input of an interpolator 1160. The register is also coupled to interpolator 1160 via its second input. Interpolator 1160 uses LERP weight parameter a8. The output of interpolator 1160 is $b_k$, a point on the surface. When used as described above, the tri-linear interpolator 500 performs what is referred to as a "separable convolution".

The process of the present embodiment evaluates the surface s(u,v) by implementing the following equation:

$$S(u, v) = \sum_i \sum_j N_i^3(u) N_j^3(v) d_{ij} \text{ for } u, \quad \text{Equation 3C}$$

-continued $$N_i^r(u) = (u - u_i)\frac{N_i^{r-1}(u)}{u_{i+r} - u_i} +$$

$$(u_{i+r+1} - u)\frac{N_{i+1}^{r-1}(u)}{u_{r+i+1} - u_{i+1}} \text{ where}$$

$$N_i^0 = \begin{cases} 1 \\ 0 \end{cases} \text{ if } u \begin{cases} \in [u_i \ u_{i+1}] \\ \notin [u_i \ u_{i+1}] \end{cases}$$

Note that there is an equivalent expression for v.

Additionally, note that dij are the local NURBS control points for the parameter value (u,r). The terms u and v are parameters of the surface, i and j are indices of the control points, and r is an index of the recursion.

By implementing equation 3C, the process of the present embodiment is able to directly evaluate a NURBS model into a surface. This process does not require the prior conversion of the NURBS model into a Bezier model. In order to implement equation 3C, the LERP weights (a1–a8) are loaded as described below.

In the general case, (e.g., 1D) a convolution equation is expressed as:

$$C(x) = \sum_{h=0}^{m} K(h) I(x - h) \quad \text{Equation 3D}$$

Where C denotes the convolved result at point x, I is the input image, and K being the m convolution kernel coefficients. Given equation 3D, the present invention derives the alpha values (i.e., LERP weights) used by the LERPS in the tri-linear interpolator 500 based on the kernel values. The present invention extrapolate equivalencies between the original kernel coefficients based on going through the tri-linear interpolator 500:

The original 1D convolve is expressed as:

$$k_0 i_0 + k_1 i_1 + k_2 i_2 + k_3 i_3 + k_4 i_4 + k_5 i_5 + k_6 i_6 + k_7 i_7$$

Using tri-linear interpolator 500, the expression is:

$$\underbrace{\underbrace{\underbrace{ai_0 + (1-a)i_1}_{e} + \underbrace{bi_2 + (1-b)i_3}_{(1-e)}}_{g} + \underbrace{\underbrace{ci_4 + (1-c)i_5}_{f} + \underbrace{di_6 + (1-d)i_7}_{(1-f)}}_{(1-g)}}_{h \text{ (scale)}} \quad \text{Equation 3E}$$

where a though g equal LERP weights and h equals the scale, and $i_x$ are the inputs of the input image. For the case of convolutions, the last LERP h (using this notation) is assigned h=1.0.

The last step for convolutions is to scale the output to de-normalize the result. We can form equivalencies between the K's and the alphas by algebraic manipulation as follows:

$$k_0 = a * e * g * h$$

$$k_1 = (1-a) * e * g * h$$

$$k_2 = b \cdot (1-e) * g * h$$

$$k_3 = (1-b) * (1-e) * g * h$$

$$k_4 = c * f * (1-g) * h$$

$$k_5 = (1-c) * f * (1-g) * h$$

$$k_6 = d * (1-f) * (1-g) * h$$

$$k_7 = (1-d) * (1-f) * (1-g) * h \quad \text{Equations 3F}$$

Equations 3F also take into account that the LERP alpha values are normalized. Additionally, before alpha values for each LERP are extrapolated, the present invention also needs to account for possible divide by zeros. These could be caused by either very sparse kernel matrices or coefficients that may cancel each other out (as is the case for some edge detectors). To compensate for these effects, the present invention works with the absolute values of each kernel coefficient and compensates by negating one of the inputs when the coefficient is negative. Given this, the LERP alphas (i.e., LERP weights) are derived as:

$$a = \frac{|k_0|}{|k_0| + |k_1|}$$

$$b = \frac{|k_2|}{|k_2| + |k_3|}$$

$$c = \frac{|k_4|}{|k_4| + |k_6|}$$

$$d = \frac{|k_6|}{|k_6| + |k_7|}$$

$$e = \frac{|k_0| + |k_1|}{|k_0| + |k_1| + |k_2| + |k_3|}$$

$$f = \frac{|k_4| + |k_5|}{|k_4| + |k_5| + |k_6| + |k_7|}$$

$$f = \frac{|k_4| + |k_5|}{|k_4| + |k_5| + |k_6| + |k_7|}$$

$$g = \frac{|k_0| + |k_1| + |k_2| + |k_3|}{|k_0| + |k_1| + |k_2| + |k_3| + |k_4| + |k_5| + |k_6| + |k_7|}$$

$$h = |k_0| + |k_1| + |k_2| + |k_3| + |k_4| + |k_5| + |k_6| + |k_7|^{**}$$

Equations 3G where a, b, c, d, e, f, and g, are LERP weights. The last LERP, h, can be used to accumulate the current result with the previous pass. However, because the present invention is interpolating as opposed to simple accumulating, the present invention needs to account for the contributions of previous passes (i.e., doing an internal multi-pass). Thus, the h for pass j would really be represented as:

$$h_j = \frac{\Sigma |k_j|}{\prod_{i=j}^{n}(1 - h_i)}$$

Equation 3H

Where j is the current pass, $h_i$ is the alpha value for pass i, n is the total number of passes, and the sum of $|K_j|$ is the magnitude (or sum) of all of the kernel coefficients corresponding to pass j. One alternative is to bypass the last LERP, and use the accumulation logic provided in the "pixel pipe" of the graphics pipeline. This ensures better precision and leaves the h alpha value as an expression dependent solely on the coefficients of the current pass. Because these values are normalized, a pre-processing step that is required with this alternate approach is that the present invention needs to first normalize the K's before performing the conversions and scale back to de-normalize on the last pass.

As described above, to compensate for negative kernel coefficients, the present invention negates the inputs based on the following:

neg B for LERP a=sign(k0) xor sign(k1)

neg B for LERP b=sign(k2) xor sign(k3)

neg B for LERP c=sign(k4) xor sign(k5)

neg B for LERP d=sign(k6) xor sign(k7)

neg B for LERP e=sign(k1) xor sign(k3)

neg B for LERP f=sign(k5) xor sign(k7)

neg B for LERP g=sign(k3) xor sign(k7)

sign of scale factor=sign(k7)

In addition, the texture filter (e.g., tri-linear interpolator 500) can also swap inputs A and B if necessary. For instance, if $k_0$ is negative (and $k_1$ positive), the A input must be negated. So, for the "a" LERP, the inputs are swapped and B negated.

Referring still to FIGS. 11A and 11B, the present invention uses look up tables 1150 to implement the global to local transformation. Texture parameters s and t are used to index the look up tables 1150 to obtain a set of NURBS control points (i.e., the set of NURBS control points A though P) appropriately indexed for the local domain. These NURBS control points comprise a portion of an array of NURBS control points, which in turn, comprise the NURBS model. The NURBS control points A through P comprise a global to local transformed 4×4 array. Additionally, the look up tables yield the LERP weight parameters a1 through a8. The LERP parameters are utilized by interpolator 500 to evaluate the NURBS control points A through P. This causes tri-linear interpolator 500, as shown in FIG. 11B, to implement convolution.

The NURBS control points A through P are fed through tri-linear interpolator 500 in two separate stages. In the first stage, NURBS control points A through H are fed through, using LERP weight parameters a1 through a7. The output of interpolator 507 (e.g., the first result) is stored in the register. In the second stage, NURBS control points I through P are fed through. This time, the output of interpolator 507 (e.g., the second result) is coupled to the first input of interpolator 1160 and the first result is coupled to the second input of interpolator 1160. The interpolator 1160 combines the first and second results, using LERP weight parameter a8, to generate $b_k$, a point on the surface. Thus, tri-linear interpolator 500 is utilized to implement a quadri-linear interpolator as shown in FIG. 11B. Again, it should be noted that tri-linear interpolator 500, in the above manner, computes a convolution of the NURBS control points.

Hence, the present invention generates a plurality of points on the surface. These points are fed back through the graphics rendering pipeline and are subsequently rendered into a resulting surface. Thus, the present invention, in accordance with this alternate embodiment, directly renders a surface from a NURBS model. As with the previous embodiment, the NURBS model is rendered using the graphics rendering pipeline (e.g., graphics rendering pipeline 301).

Figure 12A:
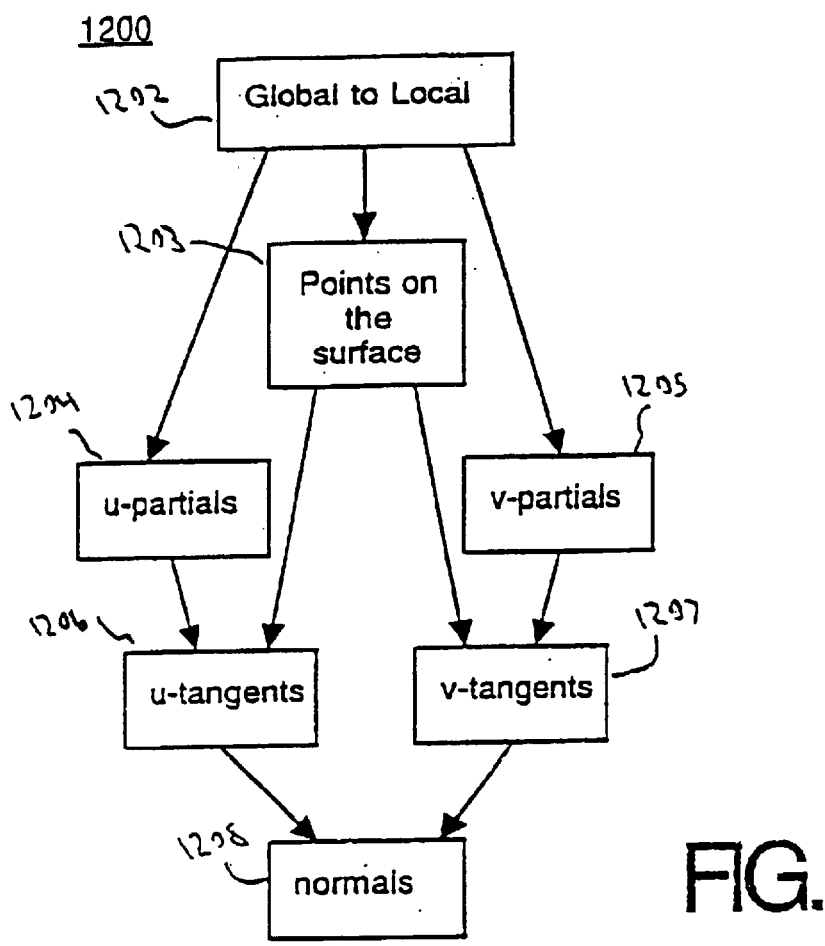
FIG. 12A shows a diagram of the process of automatic normal generation in accordance with the present invention.
Figure 12B:
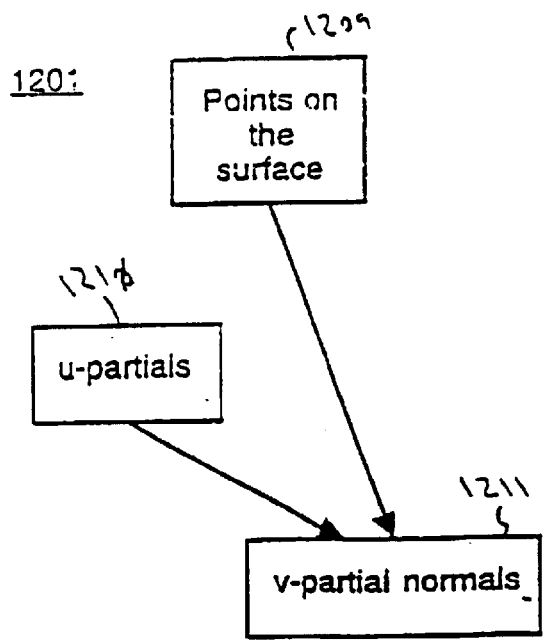
FIG. 12B shows a diagram of an optimized process of automatic normal generation.

With reference now to FIG. 12A and FIG. 12B, a diagram 1200 and a diagram 1201 are respectively shown. Diagram 1200 and diagram 1201, in accordance with the present invention, represent the processes for implementing automatic normal generation. In diagram 1200, block 1202 is the global to local domain transformation, block 1203 is the evaluation process of generating points on the curve, as described above. Blocks 1204 and 1205 are the $s_u$ and $s_v$ partial generation processes. From these partals, the $s_u$ and $s_v$ tangents are derived in blocks 1206 and 1207. From these tangents, the normals to the surface are derived in block 1208. In diagram 1201, the points on the curve are determined, as described above, in block 1209. The $s^u$ partials are determined in block 1210. From these, the sv partial/normals are determined in block 1211. It should be noted that the su and sv partials can be computed in conjunction with either surface evaluation embodiment described above (e.g., evaluation via the NURBS to Bezier conversion process, or direct NURBS evaluation via the convolution process).

Diagram 1200 generates analytically correct normals by computing the cross product of u-tangents and v tangents. The u-partials are defined by the equation:

$$S_u = [x_u \ y_u \ z_u \ w_u]^T \qquad \text{Equation 4}$$

where $s_u$ and $s_v$ are the surface partials.

The partials may be computed using either method (i.e., either the NURBS to Bezier conversion or the Mansfield convolution). Equation 4 similarly defines $s_v$, the v-partials. The u-tangents are defined by the equation:

$$\overline{s_u} = ws_u - w_u s \qquad \text{Equation 5}$$

The analytic normal direction is thus:

$$n = \overline{s_u} \times \overline{s_v} \qquad \text{Equation 6}$$

Diagram 1201 shows an alternative to diagram 1200 and produces a reasonable approximation in less time. The difference between diagram 1200 and diagram 1201 is shown in equation 7 below:

$$\overline{s_u} \times \overline{s_v} = w^2(s_u \times s_v) + w(s \times (s_u w_u - s_v w_v)), \qquad \text{Equation 7}$$
$$\text{so if } s_u w_u - s_v w_v \cong 0,$$
$$\text{then } \overline{s_u} \times \overline{s_v} \approx s_u \times s_v \text{ and } n \approx s_u \times s_v$$

In accordance with the present invention, surface partials are computed by the tri-linear filter (e.g., tri-linear filter 500). It should be noted that for surface partials, the surface partial of a point evaluated on a Bezier curve is equal to:

$$\frac{2uu \cdot uu3}{2} \qquad \text{Equation 8}$$

Thus, equation 8 is computed by negating the second input to interpolator 507 in tri-linear interpolator 500 and using a LERP weight equal to ½.

Figure 13A:
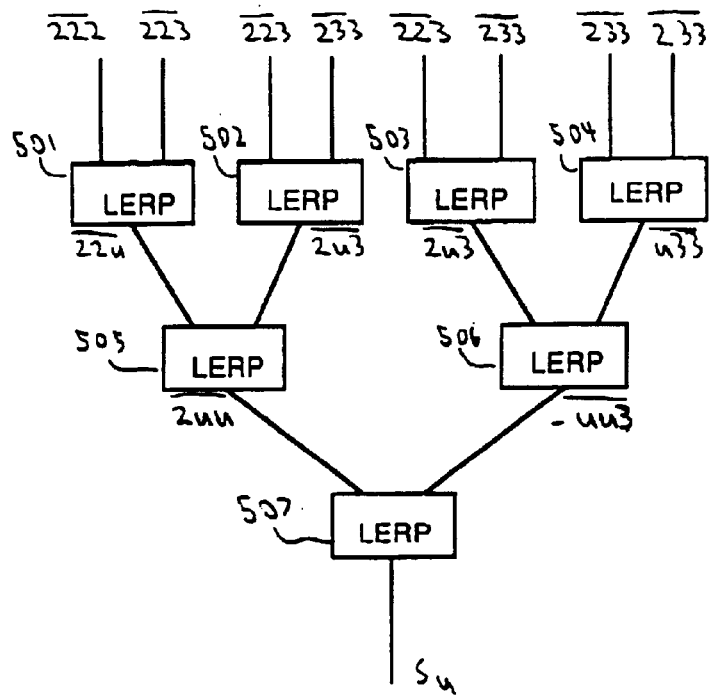
FIG. 13A shows a tri-linear interpolator having inputs implementing surface partial evaluation in accordance with the present invention.
Figure 13B:
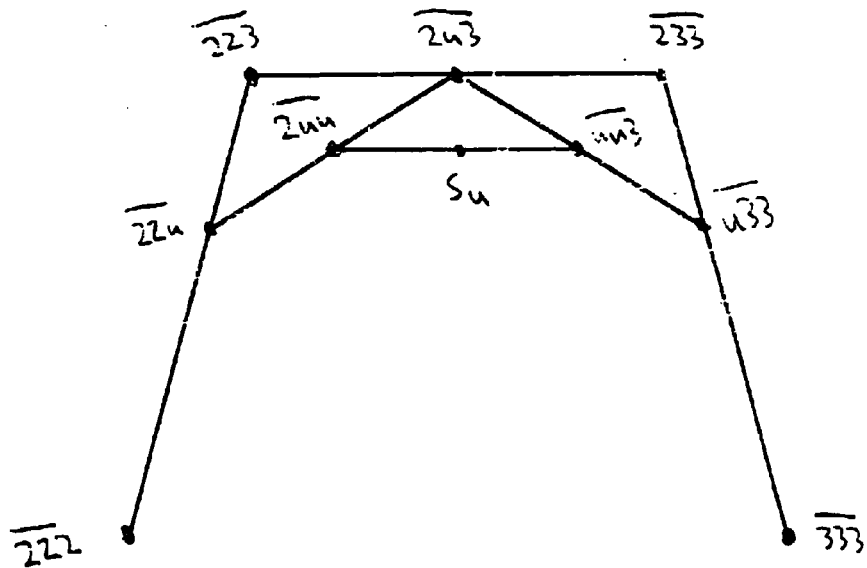
FIG. 13B shows a spatial representation of the surface partial evaluation process.

FIG. 13A and FIG. 13B show tri-linear interpolator 500 implementing surface partial evaluation in accordance with the present invention. It should be noted that the inputs to tri-linear interpolator 500 are the same as they were during the Bezier evaluation shown in FIG. 8A (which is similarly the same for the convolution process described above). The output of tri-linear interpolator 500 is the resulting partial vector (e.g., $s_u$).

The present invention subsequently uses the graphics pipeline hardware, specifically, a "blender" included within raster subsystem 304. Since, equation 5 is very similar to operations already implemented in the hardware of the blender, the present invention utilizes the blender to compute tangents from partials. The present invention uses a two step process. In the first step, the partials are evaluated into the frame buffer of raster subsystem 304 as a vertex mesh. In the second step, the surface points are fed back through the rasterizer where they are blended with the partial mesh. The blending functions are arranged according to equation 9:

$$\bar{r} = r_s \alpha_d \cdot r_d \alpha_s \qquad \text{Equation 9}$$

$[x,y,z,w]^T$ is sent as $(r_s, g_s, b_s, \alpha_s)$ data and $(r_d, g_d, b_d, \alpha_d)$ is equal to $[x_u, y_u, z_u, w_u]$ By using a subtract blending mode, the blender effectively computes:

$$xw_u - x_u w \qquad \text{Equation 10}$$

Normals are also computed as cross products in the blender using a new blending factor referred to as a "cyclic shift". Cyclic shift source factors operate as follows:

$$\begin{bmatrix} \bar{r} = r_s g_d - r_d g_s \\ \bar{g} = g_s b_d - g_d b_s \\ \bar{b} = b_s r_d - b_d r_s \\ \alpha = 0 \end{bmatrix} \qquad \text{Equation 11}$$

The cross product desired is:

$$\begin{bmatrix} n_x = y_u z_v - y_v z_u \\ n_y = z_u x_v - z_v x_u \\ n_z = x_u y_v - x_v y_u \end{bmatrix} \qquad \text{Equation 12}$$

Instead, what is actually computed is:

$$[n_z n_x n_y] \qquad \text{Equation 13}$$

Thus, in accordance with the process of the present invention;

Equation 14

$[x_u y_u z_u y]^T$ is sent as $(r_s, g_s, b_s, \alpha_s)$ $[x,y,z,x]^T$ is arranged to be $(r_d, g_d, b_d, \alpha_d)$ and thus, $[n_z n_x n_y 0]^T$ is computed as desired.

Figure 14:
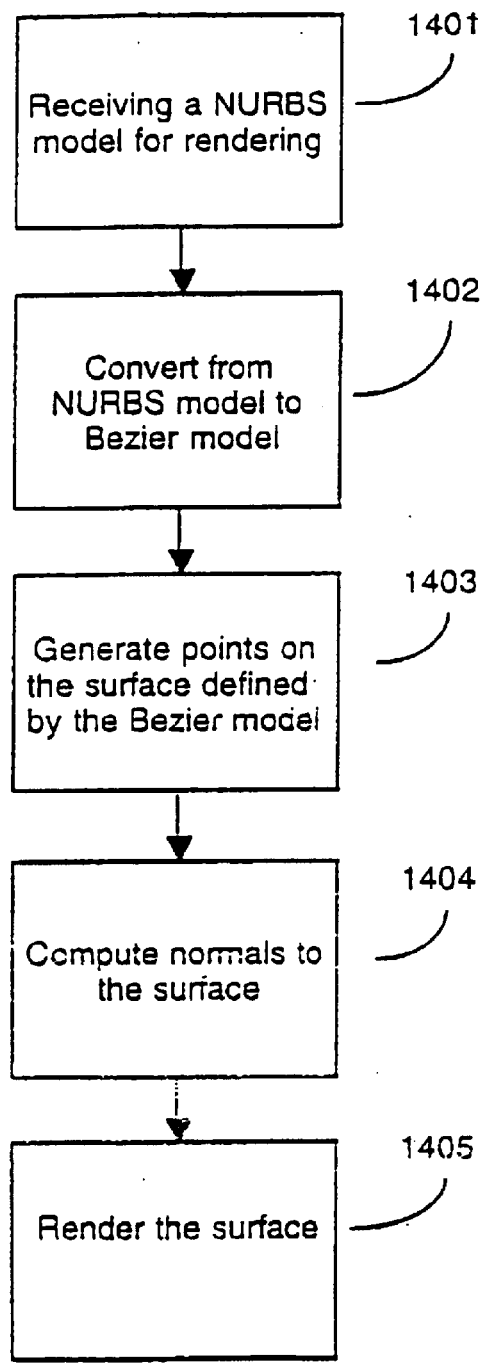
FIG. 14 shows a flowchart the steps of a method in accordance with one embodiment of the present invention.

With reference now to FIG. 14, flowchart the steps of a method 1400 in accordance with one embodiment of the present invention is shown. In step 1401, a NURBS model is received for rendering. In the present embodiment, the NURBS model is generated by a software program executing on the CPU subsystem. As described above, the NURBS model represents a 3D object.

In step 1402, the process of the present invention converts the NURBS model into a Bezier model. This involves converting the individual NURBS curves into corresponding Bezier curves. The present invention utilizes the tri-linear interpolators included with the hardware of the graphics pipeline to implement the NURBS to Bezier conversion process. Each NURBS curve to be rendered is converted into equivalent Bezier curves as described above. This is accomplished by performing curve conversions in the u direction and then in the v direction.

In step 1403, the process of the present invention generates points on the curve defined by the Bezier control points of the Bezier model. As described above, the Bezier control points are obtained via the NURBS to Bezier conversion process. The Bezier control points define a Bezier curve. The present invention uses the tri-linear interpolators to generate points on this curve. Again, this equation is performed in first the u direction and then in the v direction.

In step 1404, the present invention computes normals to the surface. As described above, the $s_u$ and $s_v$ partials are generated using the tri-linear interpolators. From these partials, the $s_u$ and $s_v$ tangents are derived using the blender hardware. From these tangents, the blender hardware is used to generate the normals to the surface. The normals are subsequently used to realistically render lighting effects on the surface.

In step 1405, the present invention renders the surface defined by the generated points and normals. As successive points are rendered, the graphics pipeline creates primitives (e.g., "quads") to render a surface. The curves in one direction (e.g., in the x direction) are rendered, the curves in another direction (e.g., the y direction) are rendered, creating a line drawing. Alternatively, the curves are coupled to form a quadrilateral mesh defining a surface.

Thus, the present invention provides a method and a system which greatly increases the speed of the graphics rendering process. The method and system of the present invention increases the speed and efficiency of the process of rendering NURBS models. The method and system of the present invention accurately renders NURBS models without burdening the data transfer bandwidth of the computer system. In addition, the method and system of the present invention does not consume an inordinate amount of host processor clock cycles. In so doing, the present invention provides a fast and efficient process for rendering NURBS models.

Figure 15:
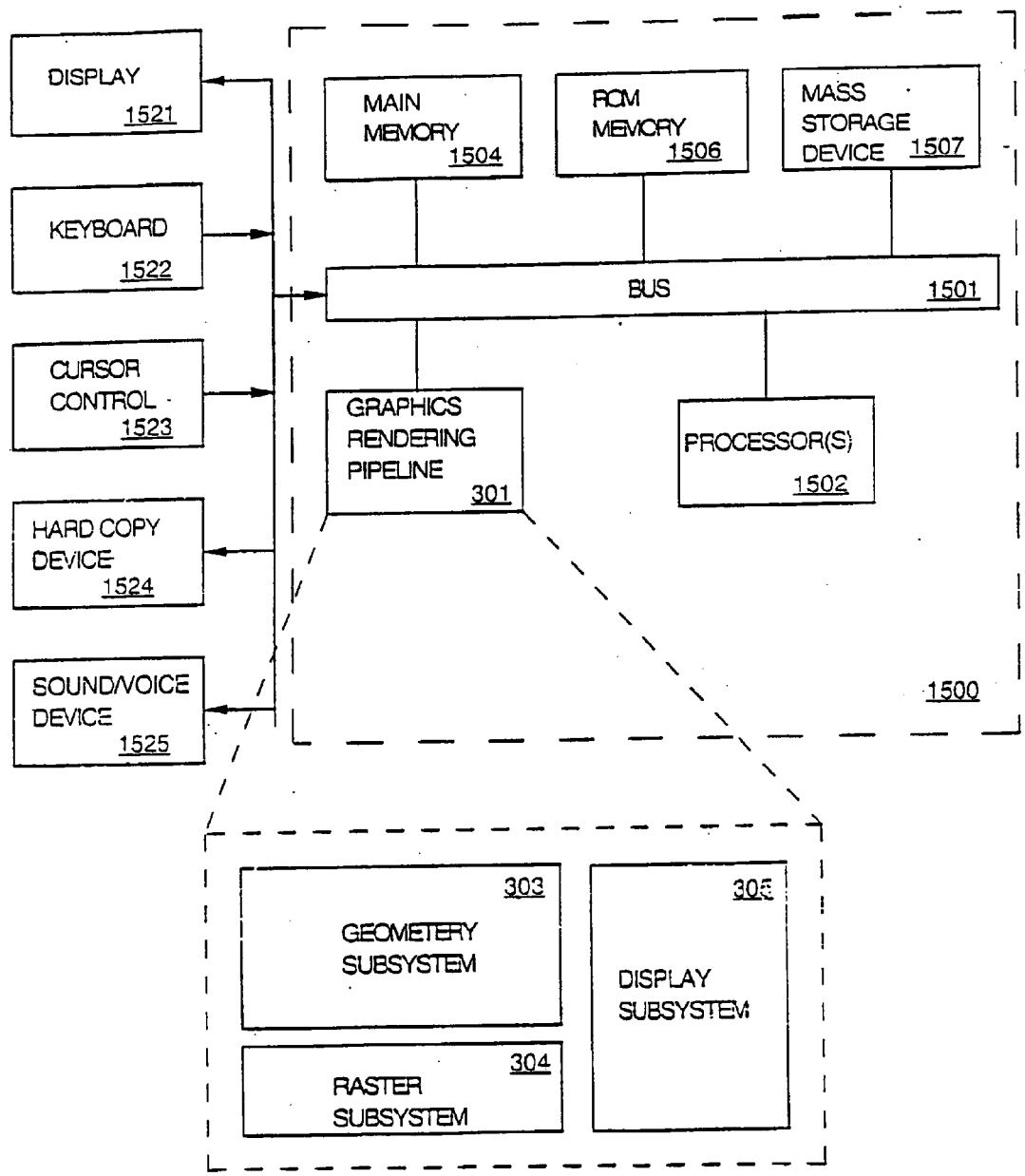
FIG. 15 shows a computer system upon which the present invention may be practiced.

Referring now to FIG. 15, a computer system upon which the present invention may be practiced is shown as 1500. Computer system 1500 includes any computer controlled graphics systems for generating complex or 3 dimensional images. Computer system 1500 includes a bus 1501 for transmitting digital information between the various parts of the computer system. One or more microprocessor(s) 1502 are coupled to bus 1501 for processing information. The microprocessor(s) 1502 comprise CPU subsystem 302 shown in FIG. 3. The information along with the instructions of how the information is to be processed are stored in a hierarchical memory system comprised of mass storage device 1507, read only memory 1506, main memory 1504, and static random access memory (SRAM) 1503. Mass storage device 1507 is used to store vast amounts of digital data. The mass storage device 1507 can consist one or more hard disk drives, floppy disk drives, optical disk drives, tape drives, CD ROM drives, or any number of other types of storage devices having media for storing data digitally. A read only memory (ROM) 1506 is used to store digital data of a permanent basis, such as instructions for the microprocessors. Main memory 1504 is used for storing digital data on an intermediate basis. Main memory 1504 can be dynamic random access memory (DRAM).

The 3D graphics rendering pipeline 301 is also included in system 1500. As described above, processor(s) 1502 provides the graphics rendering pipeline 301 with graphics data, such as drawing Commands, coordinate vertex data, and other data related to an object's geometric position, color, texture, shading, and other surface parameters. The display subsystem 305 displays the rendered image on monitor 1521.

Several other devices may also be coupled to system 1500. For example, an alphanumeric keyboard 1522 is used for inputting commands and other information to processor 1502. Another type of user input device is cursor control device 1523 (a mouse, trackball, joystick, and the like) used for positioning a movable cursor and selecting objects on a computer screen. Another device which may be coupled to bus 1501 is a hard copy device 1524 (e.g., a laser printer) for printing data or other information onto a tangible medium. Additionally, a sound recording or video option 1525 can be coupled to the system 1500 to provide multimedia capabilities.

The present invention, a method and system for efficiently drawing NURBS surfaces for 3D graphics, is thus disclosed. While the present invention has been described in particular embodiments, it should be appreciated that the present invention should not be construed as limited by such embodiments, but rather construed according to the below claims.

What is claimed is:

1. In a computer system having a processor, a bus, and a graphics rendering pipeline for displaying 3D graphics on a display, a computer implemented method for rendering a NURBS defined curve or surface without first converting the NURBS defined curve or surface to a polygon mesh, the method comprising the computer implemented steps of:
   a) receiving a NURBS model for rendering from a software program running on the processor of the computer system;
   b) converting the NURBS model to a Bezier model using the graphics rendering pipeline;
   c) generating a plurality of Bezier control points from a corresponding plurality of NURBS control points using a tri-linear interpolator in the graphics pipeline by:
      c1) using the plurality of NURBS control points as inputs to the tri-linear interpolator; and
      c2) evaluating the NURBS control points to obtain each of the plurality of Bezier control points;
   d) generating a plurality of points on a curve or surface, wherein the curve or surface is defined by the Bezier model, using the graphics rendering pipeline; and
   e) rendering the curve or surface defined by the NURBS model using the plurality of points and using the graphics rendering pipeline such that the curve or surface is rendered without first converting the NURBS model to a polygon mesh.

2. The method of claim 1 wherein step
   a) further includes the step of receiving the NURBS model in the graphics rendering pipeline via the bus, wherein the NURBS model defines all of a curve or surface, or a portion of the curve or surface, to be rendered.

3. The method of claim 1 wherein step c) further includes the step of generating a plurality of points on the curve or surface using a plurality of Bezier control points.

4. The method of claim 3 further including the steps of:
   using the plurality of Bezier control points as inputs to a tri-linear interpolator; and
   evaluating the plurality of Bezier control points to obtain the plurality of points on the curve or surface.

5. The method of claim 1 further including the steps of: processing the plurality of points with the graphics rendering pipeline; and rendering the curve or surface with the graphics rendering pipeline.

6. In a graphics rendering pipeline of a computer system, a method for rendering NURBS defined curves or surfaces using the graphics rendering pipeline without first converting the NURBS defined curve or surface to a polygon mesh, the method comprising the steps of:
   a) implementing a de Casteljau process in the graphics pipeline;
   b) evaluating a Bezier curve or surface using the de Casteljau process; and
   c) implementing the de Casteljau process using a tri-linear interpolator included in the graphics pipeline by:
      loading inputs of the tri-linear interpolator with a plurality of control points of the Bezier curve or surface; and generating a plurality of points on the curve or surface using the tri-linear interpolator; and d) rendering the Bezier curve or surface without first converting the Bezier curve or surface to a polygon mesh.

7. The method of claim 6 further including the step of using the plurality of points to render the Bezier curve or surface.

8. In a graphics rendering pipeline of a computer system, a method for generating normal vectors (normals) for a surface, the method comprising the steps of:

a) generating a plurality of surface partials from the surface by loading inputs of a tri-linear interpolator included in a graphics rendering pipeline with a plurality of Bezier control points defining the surface;

b) generating a plurality of surface tangents from the plurality of surface partials using the graphics rendering pipeline; and c) generating at least one normal from the plurality of surface tangents using the graphics rendering pipeline.

9. The method of claim 8 further including the step of generating the plurality of surface tangents from the plurality of surface partials using a blender included in the graphics rendering pipeline.

10. The method of claim 9 further including the step of generating the at least one normal from the plurality of surface tangents using the blender.

11. In a graphics rendering pipeline of a computer system, a method of using the graphics rendering pipeline to render a curve or surface directly from a NURBS (non-uniform rational B-spline) model, the method comprising the steps of:

a) performing a global to local transformation on a NURBS model using the graphics rendering pipeline;

b) evaluating a plurality of NURBS control points using tri-linear interpolation in the graphics rendering pipeline to obtain a plurality of points on a curve or surface defined by the NURBS model; and c) rendering the curve or surface using the plurality of points.

12. The method of claim 11 further including the step of indexing at least one look up table within the graphics rendering pipeline to perform the global to local transformation of the NURBS model.

13. The method of claim 12 further including the step of evaluating the plurality of NURBS control points using a tri-linear interpolator included in the graphics rendering pipeline.

14. The method of claim 13 further including the step of indexing the at least one look up table with the graphics rendering pipeline to obtain a plurality of parameters to configure the tri-linear interpolator.

15. The method of claim 14 further including the steps of: implementing a quadri-linear interpolator using said tri-linear interpolator; and generating the plurality of control points using said quadri-linear interpolator.

16. The method of claim 11 wherein step b) further includes the steps of:

using the graphics rendering pipeline to implement a convolution; and using the convolution to obtain the plurality of points on the curve or surface.

* * * * *